(12) United States Patent
Ebel et al.

(10) Patent No.: US 7,104,788 B2
(45) Date of Patent: Sep. 12, 2006

(54) DEVICE FOR PURIFYING AND/OR DECONTAMINATING POLYESTER

(75) Inventors: Achim Ebel, Rostock (DE); Carlos Dario Gutierrez, Spartanburg, SC (US)

(73) Assignee: Cleanaway Deutschland AG & Co. KG, (DE)

(*) Notice: Subject to any disclaimer, the term of this patent is extended or adjusted under 35 U.S.C. 154(b) by 489 days.

(21) Appl. No.: 10/450,861

(22) PCT Filed: Dec. 17, 2001

(86) PCT No.: PCT/EP01/14882

§ 371 (c)(1),
(2), (4) Date: Dec. 8, 2003

(87) PCT Pub. No.: WO02/47810

PCT Pub. Date: Jun. 20, 2002

(65) Prior Publication Data

US 2004/0096796 A1    May 20, 2004

(30) Foreign Application Priority Data

Dec. 15, 2000  (EP) .................................. 00127589

(51) Int. Cl.
  *C08J 11/04* (2006.01)
(52) U.S. Cl. .......................... 432/118; 432/110; 34/201

(58) Field of Classification Search ................ 432/103, 432/106, 108, 110, 112, 118; 34/201; 521/48
See application file for complete search history.

(56) References Cited

U.S. PATENT DOCUMENTS

| 4,207,062 A | * | 6/1980 | Moench et al. ............. 432/111 |
| 4,439,141 A | * | 3/1984 | Deckebach .................. 432/14 |
| 5,083,870 A | * | 1/1992 | Sindelar et al. ............... 366/25 |

FOREIGN PATENT DOCUMENTS

| DE | 2056389 A | * | 5/1972 |
| FR | 1457472 |  * | 9/1966 |

* cited by examiner

*Primary Examiner*—Gregory Wilson
(74) *Attorney, Agent, or Firm*—Robert T. Maldonado; Cooper & Dunham LLP

(57) ABSTRACT

The invention relates to an apparatus for cleaning and/or decontaminating polyester, in particular polyethylene terephthalate (PET). The apparatus has an at least partially heated rotary tubular furnace to be fed with a mixture of polyester and an alkaline material and is for carrying out a saponification reaction in the mixture. The invention is distinguished in that within the rotary tubular furnace a weir is disposed which at least partly closes the interior of the rotary tubular furnace, and an orifice is formed in the shell of the rotary tubular furnace adjacent the weir for separating undersize grain from the PET.

59 Claims, 8 Drawing Sheets

DEVICE FOR PURIFYING AND/OR DECONTAMINATING POLYESTER

BACKGROUND OF THE INVENTION

The present invention relates to an apparatus for cleaning and/or decontaminating polyester, in particular polyethylene terephthalate (termed PET hereinafter). PET is one of the most used polyesters. PET has many uses, but is primarily used in the beverage industry as material for beverage bottles.

Especially in the case of beverage bottles, in order to be able to reuse the PET even after use of the bottles and/or contamination of the bottles, processes have been developed in the prior art which enable recycling of polyester. After this recycling the cleaned or decontaminated polyester or PET can be reused for manufacturing beverage bottles, for example.

Such processes are disclosed, for example, in PCT/US99/23206. In these known processes the PET to be recycled is first comminuted into small flakes. The comminuted PET is then placed in water in order to be able to separate lighter materials, such as paper and the like, from the PET by skimming them off from the water surface. The PET is then dried by the action of heat. After drying, the treated PET is mixed with an alkaline material. This mixture is also dried by heat. In the subsequent central reaction step, the PET which has been mixed with alkaline material and dried in this manner is partially saponified with constant further drying under the action of heat. The reaction products produced by the saponification are then separated, as a result of which cleaned PET is also produced.

In order to obtain a satisfactory yield of recycled PET by the above-mentioned process, it is necessary that the central reaction step takes place essentially in an anhydrous environment. The rotary furnaces which are used for this central reaction step and which are known from the prior art, for example the Rotary Calciner, from Heyl & Patterson Inc., however, are only able to provide such conditions with restrictions.

SUMMARY OF THE INVENTION

It is therefore an object of the present invention to improve an apparatus of the type mentioned at the outset, in particular to develop it in such a manner that it is able to provide an essentially anhydrous environment for carrying out such processes.

The advantages of the invention are, in particular, that the weir inside the rotary tubular furnace which at least in part closes the interior of the rotary tubular furnace ensures a constant residence time of the mixture in the rotary tubular furnace, which residence time is independent of the throughput of the rotary tubular furnace. This in turn means that the mixture always reacts in the rotary tubular furnace under the same process parameters, such as temperature and degree of dryness. Thus, at any throughput rate, the process parameters necessary for the maximum yield of recycled polyester can be maintained.

It is advantageous if the weir is disposed in the region of the downstream end of the heated furnace region. Here, the action of the weir comes optimally into effect, since the entire length of the heated region of the rotary tubular furnace is affected.

It is advantageous if the weir has, preferably 10 to 14, further preferably 12, star-shaped through holes starting from the center of the weir. In this manner it is possible to define the through hole cross section for the mixture.

Preferably, the through holes can at least be partly covered with covers in order to vary the degree of charging of the rotary tubular furnace by varying the damming action of the weir, preferably in 5% increments of the degree of charging from 0% to about 30%, further preferably up to 50%. This embodiment guarantees maximum flexibility of the rotary tubular furnace and thus optimum adaptation of the damming action of the weir to the amount and type of mixture. The through holes or else other perforations in the weir also prevent salts formed in the mixture as a result of the saponification from building up excessively at the weir and thus impeding the reaction and/or the removal of the reaction products.

It is particularly preferred if the rotary tubular furnace forms in its interior an essentially cylindrical hollow space for receiving the mixture. Preferably here the rotary tubular furnace has on its inner surface at least one axially oriented strip. These strips make an essential contribution to improving the rotary tubular furnace with respect to furnaces of the prior art. These strips prevent the mixture from toppling over in the rotary tubular furnace. In this case PET regrind, for example, is present in the mixture in solid form. On the regrind is situated sodium hydroxide solution which has been dried onto or into the surface. During reaction of the regrind with the sodium hydroxide solution, these two reagents form two further byproducts, a salt in solid form and ethylene glycol in gaseous form. On rotation of the furnace, this mixture has the tendency to topple over in the furnace. The toppling over of the mixture in the furnace releases dust which forms as a result of the regrind particles rubbing together. This dust development known from the prior art is, however, very disadvantageous for the reasons explained hereinafter:

The continuous removal of water in the rotary tubular furnace produces a moisture gradient in the rotary tubular furnace; at the start, that is to say at about the position of the product intake, the moisture is higher than at the end of the rotary tube, that is to say at about the position of the product outlet. The dust formation behaves in the opposite manner to this course in the rotary tubular furnace. If highly dehydrated dust is swirled up at the end of the furnace, this is transported forward by the passage of exhaust air. The dust reacts with the sodium hydroxide solution and carries this out via the passage of exhaust air, since water is absorbed by the dust. Overall the surface reaction of the alkaline material on the polyester is attenuated, since this reaction only proceeds optimally without water, which gives rise, in turn, to complaints of disadvantageous decrease in the yield of cleaned polyester.

The inventive strips, however, prevent the toppling over of the mixture and thus eliminate the water absorption or absorption of sodium hydroxide solution by the dust in the furnace and thus increase the yield of cleaned material.

Advantageously, 5 to 20, preferably 12, uniformly distributed axial strips are provided along the periphery. Thus toppling over of the mixture is constantly prevented over the entire inner periphery.

It is further advantageous if the at least one axially oriented strip extends radially inward into the interior of the rotary tubular furnace in such a manner that in the entire speed range of the rotary tubular furnace toppling over of the mixture in the rotary tubular furnace is reliably prevented.

Advantageously, the rotary tubular furnace has a diameter of 2 m to 4 m, preferably 2.6 m, and a heated length of 15 m to 25 m, preferably 18 m. In this manner the required reaction times of more than 2 hours may be effected.

Preferably, the rotary tubular furnace has, to receive the mixture, a mixture intake cylinder having a diameter of 0.5 m to 1.5 m, preferably 0.8 m. It is advantageous here if the rotary tubular furnace has, to deliver the mixture, a mixture outlet cylinder having a diameter of 1 m to 3 m, preferably 1.8 m. Both dimensions fit, in particular, with the above overall furnace length.

Preferably, the mixture intake cylinder and/or the mixture outlet cylinder is connected to the rotary tubular furnace via a conical passage.

It is advantageous if the rotary tubular furnace has, within the mixture outlet cylinder, forced transporting elements, for example transport spirals, for transporting the mixture, in order to prevent material blockage in the case of an advantageous tapering of the tube in the region of the seal of the mixture outlet cylinder and to guarantee uniform transport of the mixture.

Preferably, at the ends of the mixture intake cylinder and/or the mixture outlet cylinder, flanges are disposed for receiving seals for airtight sealing of the furnace. These seals are particularly important, since they prevent water or moisture from passing into the furnace. They therefore likewise increase the yield. The seal is particularly important at the outlet, since there, in the event of moisture ingress, depolymerization of the product would occur.

Preferably, the rotary tubular furnace has, in its interior, about six scoop pockets which transport the product up to the outlet side cone into the mixture outlet cylinder, in particular when smooth forced transport occurs.

It is advantageous if the rotary tubular furnace, for mechanical transport of the mixture, has an inclination to the horizontal. The inclination also at least ensures transport of the mixture through the furnace.

It is advantageous if the rotary tubular furnace has a hinge bearing at its outlet end, so that the rotary tubular furnace can be swung into the inclination by lifting the rotary tubular furnace on the inlet side and pivoting the rotary tubular furnace about this hinge bearing.

Preferably, the inclination is 10 mm/m to 20 mm/m, preferably 15 mm/m. At these values of inclination the optimum mixture velocity in the furnace is achieved.

Preference is given to providing, within the rotary tubular furnace, preferably 5 to 20, further preferably 10, thermocouples for monitoring the mixture temperature in the rotary tubular furnace, which thermocouples are fastened to a measuring beam which is stationary relative to the rotary tubular furnace, within the rotary tubular furnace. By this means the desired reaction temperature in the furnace can be exactly monitored and, if appropriate, controlled.

Preferably, two thermocouples are provided per heating zone. Individual control for each heating element is then possible.

It is advantageous if, at an axial point of the rotary tubular furnace, in each case two thermocouples are provided which are provided at different distances to the axis of rotation of the rotary tubular furnace within the rotary tubular furnace. This grid-like arrangement of the sensors in the furnace permits monitoring of the temperature at various depths of the reacting mixture, since the thermocouples extend into the mixture to different depths.

It is advantageous if the rotary tubular furnace has 2 to 5, preferably 3, process zones along its longitudinal axis. By this means various process steps may be completed in one furnace.

It is advantageous if the design, length and temperature of the first process zone are such that further predrying of the mixture can be performed, preferably from 0.8% to 0.2%, preferably 0.4, water content to 100 ppm to 50 ppm, preferably 80 ppm, water content.

Preferably, the design, length and temperature of the second process zone are such that a surface reaction takes place for partial saponification of the mixture.

It is advantageous if the design, length and temperature of the third process zone are such that a diffusion reaction takes place for removing aromatic contaminants in the mixture.

Preferably, at least three, preferably five, further preferably equal-length, heating zones are provided in the rotary tubular furnace. By this means, for each furnace section, the desired temperature in the furnace can be set very accurately.

It is advantageous if heating radiators are provided outside the rotary tubular furnace, to heat the rotary tubular furnace externally, so that indirect heating of the mixture can be produced in the rotary tubular furnace.

Preferably, the rotary tubular furnace has a hot air orifice for the inflow of hot air into the interior of the rotary tubular furnace, and preferably has a second orifice for the outflow of the used hot air.

Preferably a hot-air generator is provided for generating the hot air, the temperature of which essentially corresponds to the temperature in the interior of the heated rotary tubular furnace. In this manner a temperature drop on entry of the air into the interior of the furnace is avoided.

Preferably, a hot-air drier is provided for drying the hot air provided for the interior of the rotary tubular furnace. Thus, the hot air also cannot carry any harmful moisture into the furnace.

It is advantageous if, in the rotary tubular furnace, a countercurrent airflow preferably consisting of hot air, further preferably consisting of dry hot air, can be produced by means of a fan in the opposite direction to the direction of motion of the mixture. By installing the fan in such a manner that the air flows in the opposite direction to the motion of the mixture in the furnace, constantly maximally clean and dry hot air arrives at the end section of the furnace already comprising cleaned polyester, so that this valuable product is optimally protected against moisture effects.

It is advantageous if a mixer is provided for mixing the mixture before entry into the rotary tubular furnace, which mixer preferably has a heated mixing screw. In this manner also a temperature drop of the mixture on entry into the furnace is prevented.

It is advantageous if, upstream of the mixer, a predrier is provided for drying the polyester provided for the mixer. This also prevents the entry of harmful moisture into the furnace.

It is advantageous if the heating output of the predrier for drying the contents of the predrier is greater than the aerating output of the predrier for drying the contents of the predrier. This prevents unreacted sodium hydroxide solution from being removed.

It is advantageous if, in the predrier, a countercurrent airflow can be produced in the opposite direction to the direction of motion of the material to be dried in the predrier.

BRIEF DESCRIPTION OF THE DRAWINGS

Exemplary embodiments of the inventive apparatus will now be described with reference to the drawings, in which.

DETAILED DESCRIPTION OF THE PREFERRED EMBODIMENTS

Figure 1:
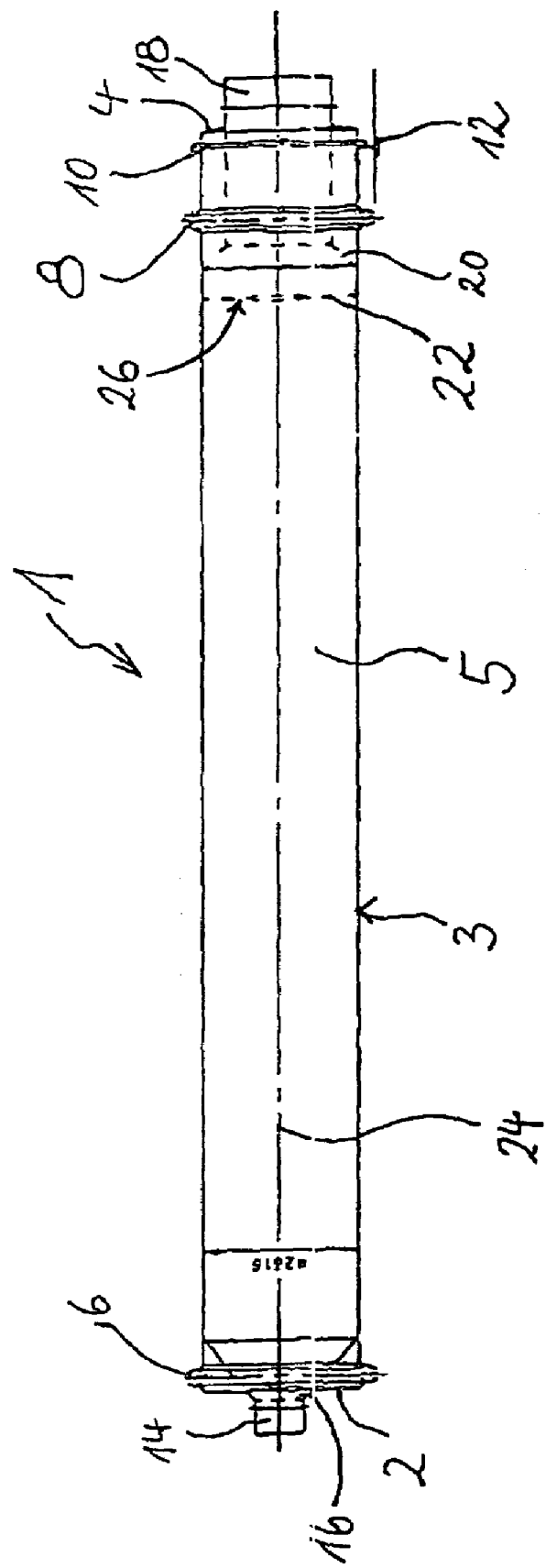
FIG. 1 shows a side view of a rotary tubular furnace.

FIG. 1 shows a side view of a rotary tubular furnace 1. The rotary tubular furnace 1 has a cylindrical shell 3 and is mounted so as to be able to rotate on bearings which are not shown by means of running rings 6 and 8 provided in the region of its ends 2 and 4, respectively. The shell 3 surrounds a product space 5 for receiving the mixture to be treated, which is not shown.

The end 4 forms the outlet-side end and the end 2 forms the inlet-side end of the rotary tubular furnace 1. The rotary tubular furnace 1 can be driven via a toothed ring 10 provided in the region of the end 4, which toothed ring is driven by a toothed ring pinion 12 driven by a motor which is not shown. The rotary speed of the rotary tubular furnace 1 may be set between 0.5 and 5.0 rpm.

On the inlet side, the end 2 has a coaxial cylindrical extension 14. This serves the rotary tubular furnace 1 as mixture intake for the mixture. The extension 14 has a smaller diameter than the shell 3 and is connected to the shell 3 via a conical connection piece 16.

On the outlet side the end 4 likewise has a coaxial cylindrical extension 18. This serves the rotary tubular furnace 1 as mixture outlet for the recycled mixture. The extension 18 has a smaller diameter than the shell 3, but a greater diameter than the inlet-side extension 14, and is connected to the shell 3 via a conical connection piece 20 which, owing to the smaller difference in diameter compared with the inlet side between the extension 18 and the shell 3, at the same gradient is shorter than the connection piece 16 at the end 2.

In the region of the outlet-side end 4, but, in the direction of motion of the mixture, still upstream of the connection piece 20, a star-shaped weir 22 is provided. This weir 22 extends radially from the axis of rotation 24 of the rotary tubular furnace 1 from the interior to the shell 3. In the weir 22 are provided through holes 26 for the mixture.

Figure 2:
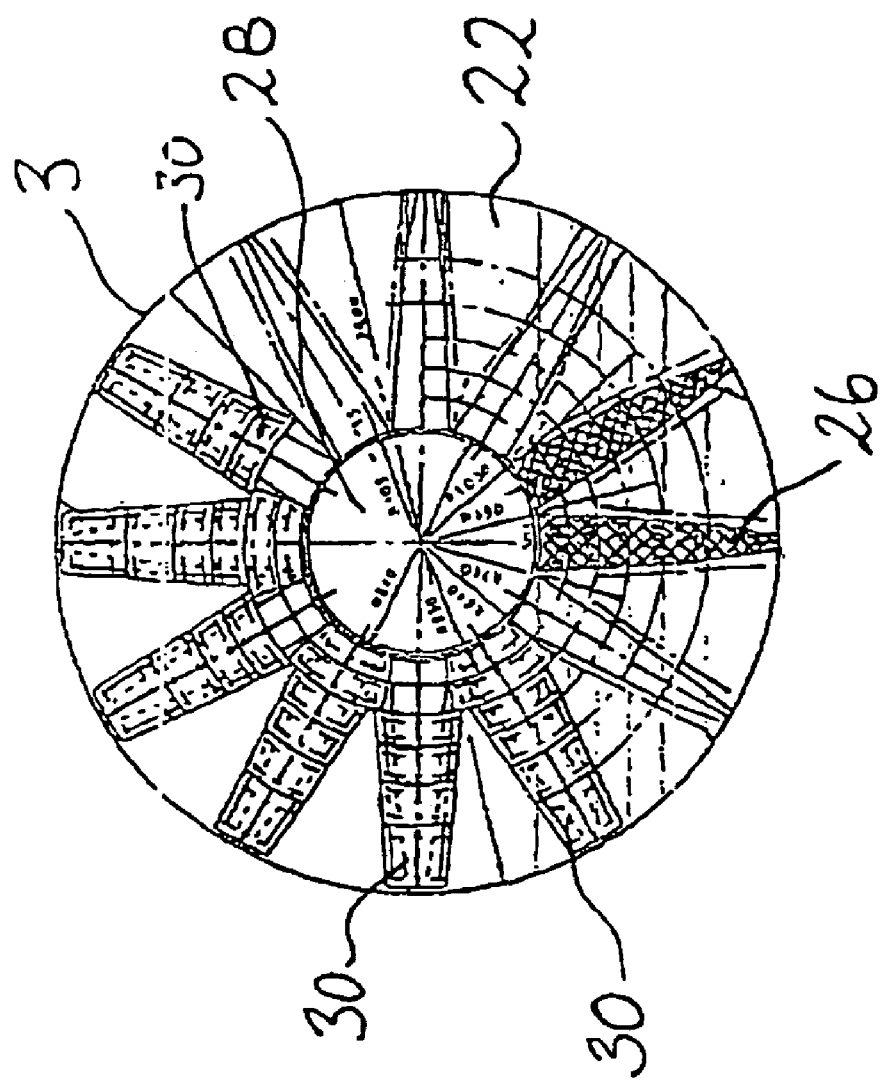
FIG. 2 shows the weir of the rotary tubular furnace of FIG. 1 in a front view.

FIG. 2 shows the weir 22 of the rotary tubular furnace 1 of FIG. 1 in a front view. FIG. 2 shows twelve through holes 26 in the weir 22 which extend in a star shape from a closed central region 28. The orifices 26 may be individually closed using the covering sheets 30.

Figure 3:
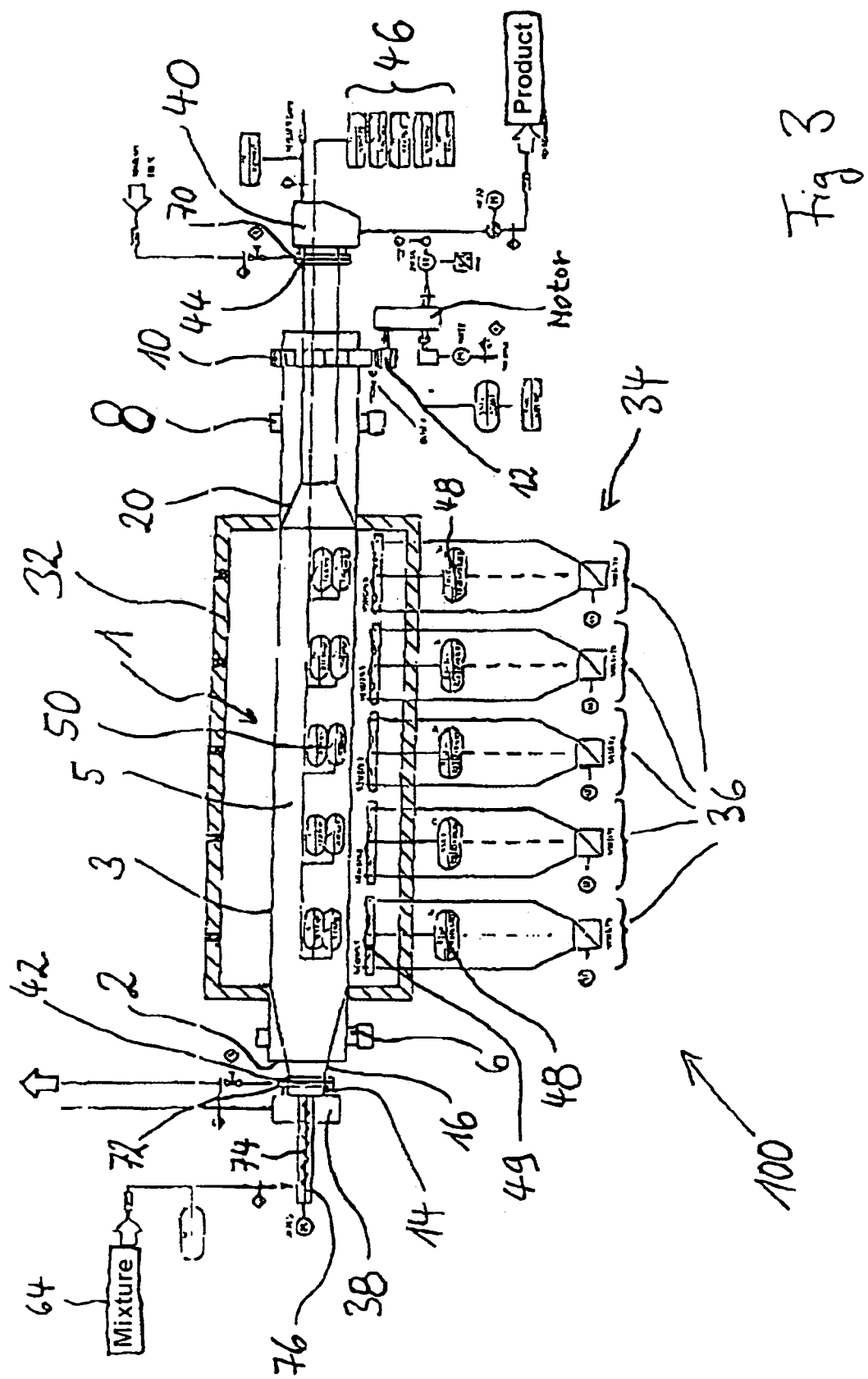
FIG. 3 shows a partial cross-sectional side view of an apparatus having the rotary tubular furnace of FIG. 1.

FIG. 3 shows a partial cross-sectional view of an apparatus 100 having the rotary tubular furnace 1 of FIG. 1. Parts which correspond to those of FIGS. 1 and 2 are identified with the same reference numbers.

Furthermore, FIG. 3 shows the following:

a heating tunnel 32 enclosing the rotary tubular furnace 1 and having an electrical heating device 34, which heating tunnel 32 axially surrounds the furnace shell 3. The heating tunnel 32 does not rotate in conjunction with the rotary tubular furnace 1 and is fitted with five separately controllable heating zones 36. Each heating zone 36 has a separate heat radiator 49 which irradiates the shell 3 of the rotary tubular furnace 1 externally with heat.

Intake 38 and outlet 40 housings each close off the ends of the product space 5 (formed by the furnace shell 3). Both housings 38 and 40 are stationary.

Inlet- and outlet-side Burgmann seals 42 and 44 seal off the product space 5 between the rotating furnace shell 3 and the stationary inlet- and outlet-housings 38 and 40.

Instruments for measuring the product temperatures 46 and the shell temperatures 48, are each present for each temperature control zone 36. The instruments for measuring the product temperatures and mixture temperatures have stationary thermocouples 50 in the product space. In each case a pair of thermocouples 50 are provided per heating zone 36.

Figure 4:
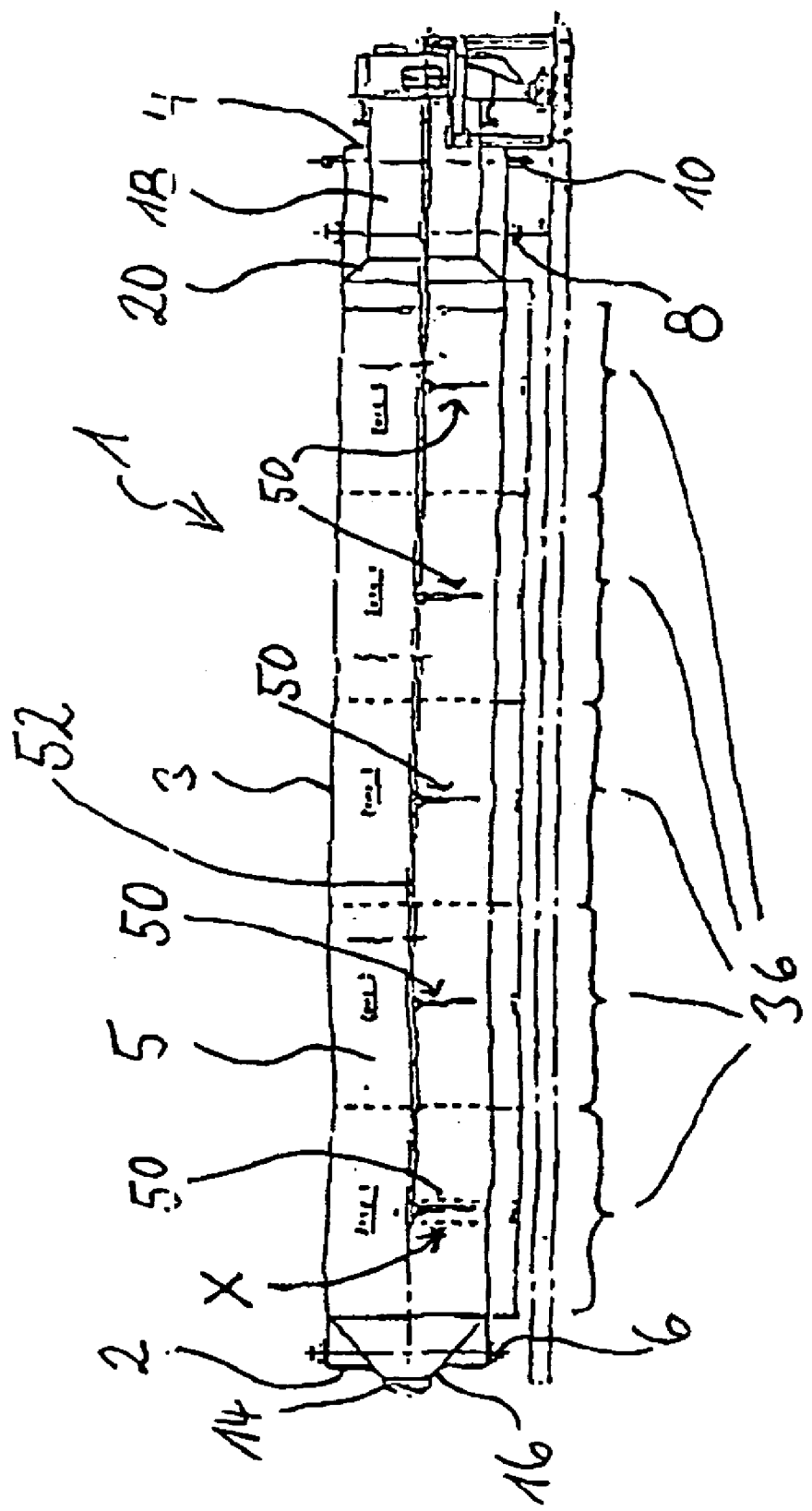
FIG. 4 shows a side view of another embodiment of the invention.

FIG. 4 shows the view of FIG. 1 with diagrammatically represented thermocouples 50. The thermocouples are fixed to a central measuring beam 52.

Figure 5:
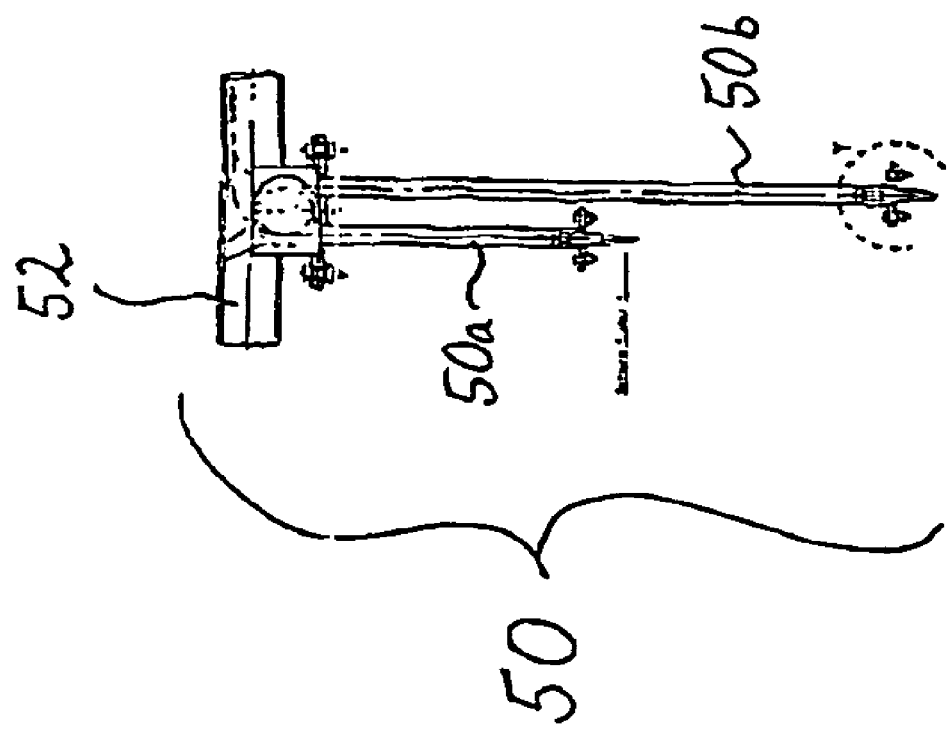
FIG. 5 shows a side view of two thermocouples of a heating zone of the rotary tubular furnace.

FIG. 5 shows a detail view of a pair of thermocouples 50 of a heating zone 36. It may be seen that the two thermocouples 50a and 50b are at different distances from the central measuring beam 52, so that they extend to a different extent into the mixture.

Figure 6:
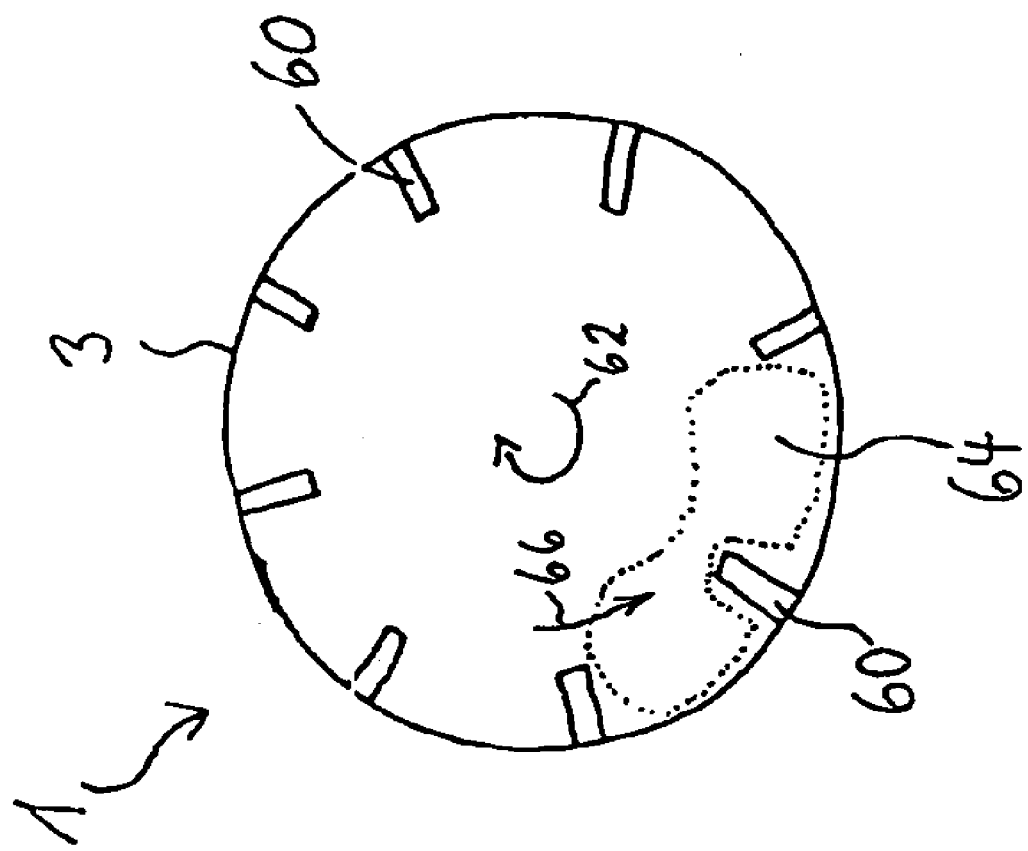
FIG. 6 shows a cross-sectional view of the rotary tubular furnace having strips.

FIG. 6 shows a cross-section of the shell 3 which provides detail of strips 60 in the rotary tubular furnace 1 of FIG. 1. The furnace 1 rotates in accordance with arrow 62. The strips 60 prevent the mixture 64 from toppling over during rotation of the rotary tubular furnace 1. During rotation of the rotary tubular furnace 1, the mixture 64 rather, because of the strips 60, always slides back in accordance with arrow 66, without toppling over.

The mode of operation of the rotary tubular furnace 1 shown is described hereinafter. This mode of operation forms a part of the present invention. The direction of claims toward the details of this mode of operation is reserved here.

The indirectly heated rotary tubular furnace 1 serves for reprocessing the mixture 64 (here recycled PET regrind), which is recirculated to the product space 5 in the predried state (residual moisture max. 0.4% by mass of water). The feed material additionally contains NaOH (max. 10% by mass of 50% strength NaOH), which reacts with the PET on the surface under the temperature conditions in the rotary tubular furnace 1—PET granules are formed which, after further process steps, are again suitable for producing food packaging. The approval for the use in food packages is connected to the fact that the PET residence time above 400 K is at least 2 hours.

During start-up of the furnace 1, the star weir 22 should firstly be adapted to the processing conditions. For this it is important to know that the function of maintaining constancy of the product residence time (in the heatable furnace region) is achieved independently of product throughput rate only in an absolutely ideal manner provided that the mechanical product behavior and also furnace rotary speed and furnace inclination are kept constant. The mechanical product behavior will essentially remain constant (independently of the throughput rate), if the particle size distribution and the global particle shape of the PET regrind do not change. The star weir 22 is set by opening or closing the parabolic through holes 26 in the star weir 22—for this the closure sheets 30 which can be screwed in are provided for in total twelve through holes 26.

The adjustment operations should be carried out in the cold furnace state, preferably according to the following plan:

Start with six open through holes 26, the preferred furnace speed of rotation (proposed 4 min$^{-1}$) and fixed (for example half) throughput rate of representative feed material.

Wait for the steady-state operating state (10–15 hours) and monitor the product charging state at the star weir 22 with the furnace 1 stationary. It is presumed that the charging state existing at this first monitoring may not yet correspond to the preset charging state for the chosen throughput rate. If it is too low, some holes 26 must be closed; if it is too high, further holes 26 must be opened—the appropriate number must be determined by calculation using a simple rule of three.

Restart the furnace drive and product feed at the above-selected settings. After waiting again for the steady-state operating state (about 10 hours), again check the product charge state at the star weir 22 with furnace 1 stationary—now the preset and actual values should agree (if not a repeated adaptation is necessary).

If it is considered necessary, this can be followed by checking as to whether the conditions are correct even under changed throughput rates.

It can likewise be expedient to check the effect of a variation in speed of rotation, so that any inadequacies present in the function of the star weir 22 (for example in the event of a changed particle size distribution as a function of the throughput rate) can be compensated for by a (slight) adaptation of the rotary speed.

Should at some time a general change in product quality arise, the star weir 22 is to be readjusted for this product—the same applies in the event of a general change in standard furnace speed of rotation or up to a change in furnace inclination.

After the adjustment procedures to the star weir 22 have been completed (and if appropriate the furnace 1 has been run completely empty), heating up can be started.

For this the following information is of importance:

For monitoring, the following are available for each temperature control zone 36, one radiation pyrometer 48 for contact-free measurement of the drum wall temperature, two double thermocouples 50 for measuring the product temperature (preferably 700 mm and 200 mm distance from the drum wall 3) and a plurality of double thermocouples for over temperature monitoring of the electrical heating elements.

The product temperature is measured (as described above) at two different distances from the drum wall 3, that is to say one high in the product bed and one deep in the product bed. The deep measuring points are always in contact with product provided that the degree of furnace charge is above 3.5%; in the case of the high measuring points this is only the case at charge degrees greater than 21.5%. It may be noted that the high measuring points in part do not indicate the product temperature, but the gas temperature.

The heating power for each temperature control zone can be set steplessly from zero to a maximum, preferably individually matched to the respective requirements. The respective heating power is controlled automatically via inputting the preset drum shell temperature for each control zone 36 and measuring the actual drum shell temperature by the radiation pyrometer 48.

The heating power is in each case restricted by monitoring the maximum permissible heating element temperature by means of the above-mentioned double thermocouples 50.

In selection of the drum wall temperatures, it must be noted that PET has a melting point of approximately 250° C. (lower values are also possible as a result of impurities). Practical and theoretical studies have found that for product temperatures less than 180° C., drum shell temperatures up to a maximum of 280° C. can be employed without melting of product in the drum shell 3 occurring—however, a condition for this is a sufficiently rapid mixing of the product 64; it is therefore recommended to employ a drum speed of at least 4 min$^{-1}$. Above a product temperature of 180° C., the drum wall temperature should be set below the melting point (that is to say less than 250°); above a product temperature of 220° C., the wall temperature, for safety, should be decreased to <230° C. (because of a possible lower melting point due to impurities in the PET). The displays of the low measuring points (see above) should always be used as a basis for the index of the relevant product temperatures in this case.

To avoid hydrolysis of the PET at high temperatures, dried (and preheated to 220° C.) hot air is passed through the product space 5—so that the residual moisture vaporized in the inlet region does not come into contact with the further heated PET in the outlet region, the air is passed through the furnace 1 in countercurrent to the product. In this context, particular importance is ascribed to the Burgmann seals 42 and 44 which form the transition between the rotating rotary furnace shell 3 and the stationary intake and outlet housings 38 and 40. Attempts should be made to prevent, at these points, ambient air from entering into the product space 5, or dust and gases from the furnace 1 from escaping. In order that this can be reliably ensured, the Burgmann seals 42 and 44 should likewise be exposed to dried (and preheated to 220° C.) air. The inlet pressure of this air feed should be chosen to be high enough so that no process gases are forced into the Burgmann seals 42 and 44 and so that dust is kept away from the seal surfaces ("blown off")—in principle this can be implemented most simply and reliably if the product space 5 is kept at a slight reduced pressure (−0.1 to −1 mbar). It is desirable to restrict the volumetric flow rate of the air charge-control of this is provided in each case by means of an on-site volumetric flow display and a control valve.

In the event of loss of the main furnace drive (for example due to damage to the motor or a power outage), care should be taken for this that (provided that the furnace shell 3 is hot) an emergency drive is used (for example auxiliary motor on emergency power busbar) and that the heating device 49 is turned off.

The (slow) continued rotation of the furnace 1 is required to prevent sticking of the product to the furnace shell 3. These measures are preferably part of a plant interlock system and should proceed automatically.

Figure 7:
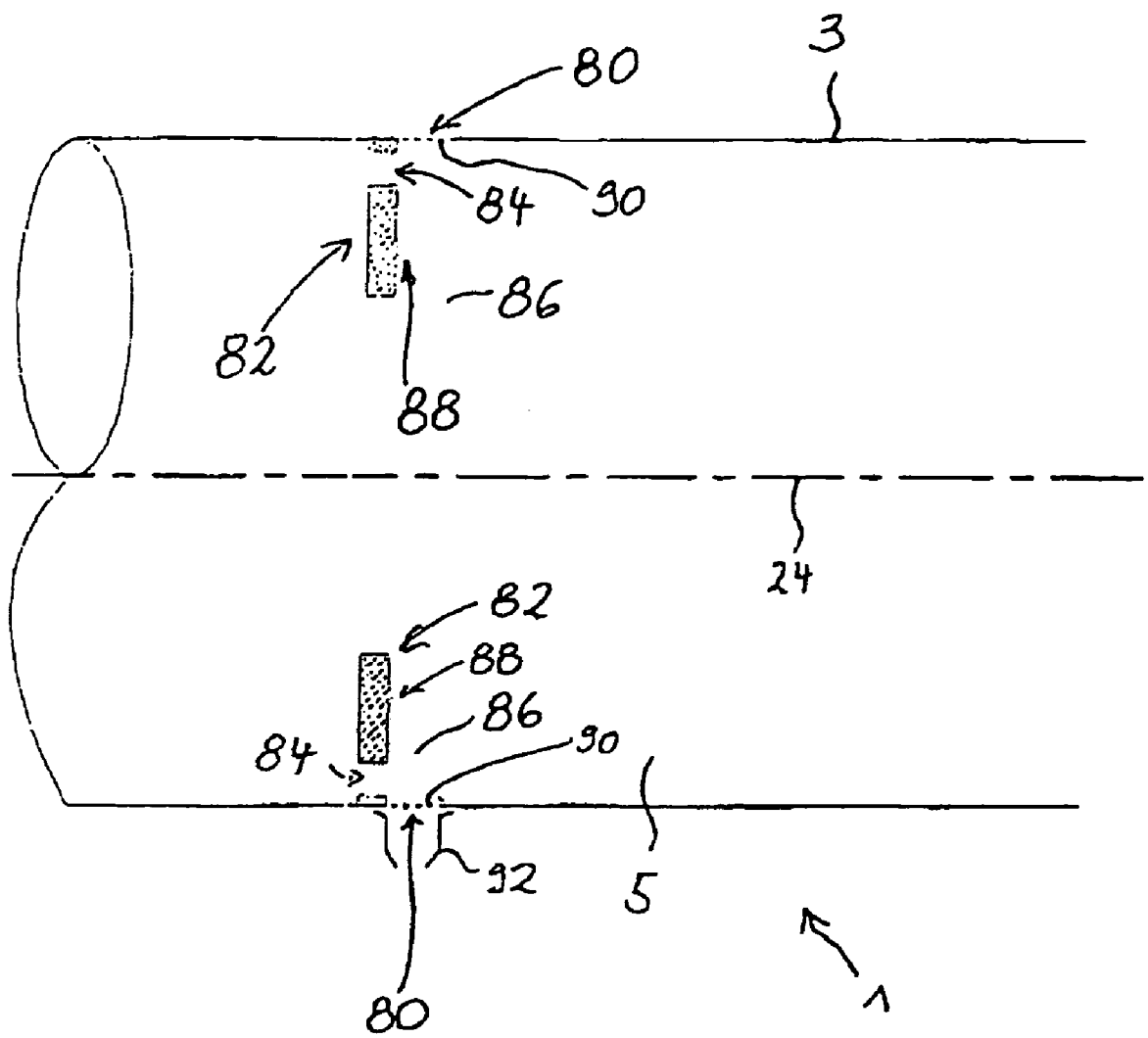
FIG. 7 shows a side view of orifices formed in the rotary tubular furnace of FIG. 1.

FIG. 7 shows a side view of orifices 80 formed in the rotary tubular furnace 1 of FIG. 1. The orifices 80 lead to the outside perpendicular to the longitudinal axis of the rotary tubular furnace 1 through the shell 3. The hollow space 5 has a second weir 82 adjacent to the orifice 80. The second weir 82 is disposed upstream of the orifice 80. The second weir 82 has a through hole 84 which is disposed adjacent to the orifice 80 and adjacent to the cylindrical shell 3 of the rotary tubular furnace 1.

In addition, deflection means 86 is provided downstream behind the through hole 84, is constructed from sheet metal and is directed at least temporarily essentially to the orifice 80. The deflection means 86 pivots under the force of gravity about a pivot axis 88, the pivot axis 88 being disposed at the second weir 82 in such a manner that the deflection means 86 only leads to the orifice 80 when the hollow space 5, on rotation of the rotary tubular furnace 1, is in the lower dead point of a rotation. This is indicated in the lower part of FIG. 7.

In addition, the orifice 80 is covered at least in part by a screen 90 serving as screen device. The orifice 80 leads to a collection device 92 for material exiting the rotary tubular furnace 1 through the orifice 80.

The functioning of the orifice 80 is as follows:

If material is situated in the lower region of the rotary tubular furnace 1, the flap 86 is closed by the force of gravity. Coarse-grained material passes over the weir 82 and separated fine-grain material, which is termed undersize grain, passes through the lower orifice 80 to the outside. After exit of the fine-grained material, there is a screening through the screen layer 90 mounted in a ring shape on the furnace shell 3. The screen layer 90 need not absolutely be porous. The undersize grain of this screen is separated by the collection device 92. The undersize grain remaining on the screen coat 90 is transported in conjunction with the material passing by. The orifice 80 therefore offers the possibility of separating undersize grain from the mixture by installation of the upstream smaller weirs 82. If PET is to be cleaned using the rotary tubular furnace 1, the undersize grain is salts and PET fines which can be separated from the mixture thanks to the orifice 80, which increases the quality of the end product.

Figure 8:
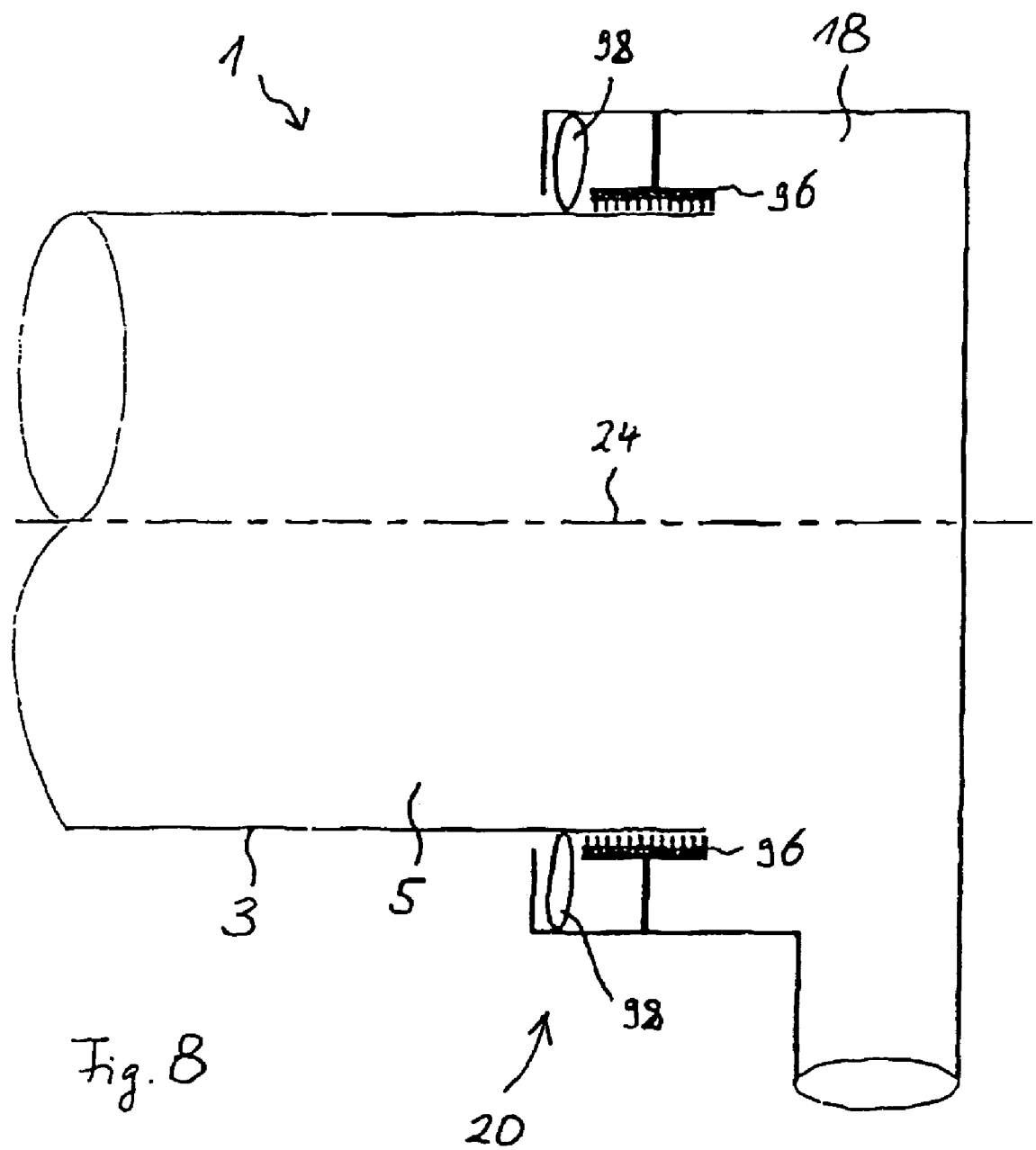
FIG. 8 shows a diagrammatic detail of brushes in the rotary tubular furnace of FIG. 1.

FIG. 8 shows a diagrammatic detail view of brushes 90 in the rotary tubular furnace 1 of FIG. 1. The connection piece 20 between rotary tubular furnace 1 and mixture outlet cylinder 18 has two brushes 96 for brushing off material penetrating the connection piece 20. The brushes 96 prevent dust from depositing at this point, since dust penetrating the seal 98 between mixture outlet cylinder 18 and rotary tube 1 is constantly being brushed off. The brushes 96 are turned in such a manner that material penetrating into the connection piece 20 is brushed back to the mixture outlet cylinder 18, away from a seal 98, that is to say into the mixture outlet cylinder 18. From there, the dusts can be discharged either by an air extractor or together with the material flow.

The invention claimed is:

1. An apparatus for cleaning polyester, comprising an at least partially heated rotary tubular furnace to be fed with a mixture of polyester and an alkaline material and for carrying out a saponification reaction in the mixture, one weir disposed within the rotary tubular furnace, which weir at least partly closes an interior space formed by a shell of the rotary tubular furnace, wherein the weir includes at least one through hole and a closure for at least partly closing the through hole to vary the degree of charge of the rotary tubular furnace by varying a damming action of the weir, and wherein the interior space includes at least one orifice formed in the shell of the rotary tubular furnace which connects the interior space to an exterior space surrounding the rotary tubular furnace in a direction perpendicular to a longitudinal axis of the rotary tubular furnace.

2. The apparatus as claimed in claim 1, wherein the weir is disposed in a downstream end of the interior space.

3. The apparatus as claimed in claim 1, wherein the weir has ten to fourteen through holes extending in a star shape from a center of the weir.

4. The apparatus as claimed in claim 3, wherein the through holes can be covered at least in part by the closure to vary the degree of charge of the rotary tubular furnace by varying the damming action of the weir in 5% increments of the degree of charge from 0% to 50%.

5. The apparatus as claimed in claim 1, wherein the closure has an iris diaphragm.

6. The apparatus as claimed in claim 5, wherein the iris diaphragm can be set steplessly.

7. The apparatus as claimed in claim 5, wherein the iris diaphragm can be set from outside the rotary tubular furnace.

8. The apparatus as claimed in claim 1, wherein the interior space formed by the shell of the rotary tubular furnace is an essentially cylindrical hollow space for receiving the mixture.

9. The apparatus as claimed in claim 1, further comprising at least one second weir disposed in the interior space essentially adjacent to the at least one orifice.

10. The apparatus as claimed in claim 9, wherein the at least one second weir is disposed essentially upstream from the at least one orifice.

11. The apparatus as claimed in claim 9, wherein the at least one second weir includes a through hole disposed essentially adjacent to the at least one orifice.

12. The apparatus as claimed in claim 11, wherein the through hole in the at least one second weir is disposed adjacent to the shell of the rotary tubular furnace.

13. The apparatus as claimed in claim 9, further comprising deflecting means attached to the at least one second weir and pivotal toward the at least one orifice.

14. The apparatus as claimed in claim 13, wherein the shell is rotatable about the longitudinal axis of the rotary tubular furnace, and the deflecting means extends toward the at least one orifice at a point of rotation of the shell where the at least one orifice is located on an underside of the rotary tubular furnace.

15. The apparatus as claimed in claim 13, wherein the deflecting means is pivotal about a pivot axis under the force of gravity.

16. The apparatus as claimed in claim 15, wherein the pivot axis is disposed at the at least one second weir, and the deflecting means is disposed downstream of the through hole in the at least one second weir.

17. The apparatus as claimed in claim 1, wherein the at least one orifice is covered at least in part by a screen device.

18. The apparatus as claimed in claim 1, wherein the at least one orifice leads to a collection device disposed in the exterior space for collecting material passing through the at least one orifice.

19. The apparatus as claimed in claim 1, further comprising at least one axially oriented strip formed on an inner surface of the rotary tubular furnace for preventing the mixture from toppling over in the rotary tubular furnace.

20. The apparatus as claimed in claim 19, wherein the at least one axially oriented strip comprises five to twenty axially oriented strips uniformly distributed along the periphery of the inner surface of the rotary tubular furnace.

21. The apparatus as claimed in claim 19, wherein the at least one axially oriented strip extends radially inward in the interior space of the rotary tubular furnace to a sufficient extent that in an entire rotary speed range of the rotary tubular furnace, the mixture is prevented from toppling over in the rotary tubular furnace.

22. The apparatus as claimed in claim 1, wherein the rotary tubular furnace has a diameter of 2 m to 4 m and a heated length of 15 m to 25 m.

23. The apparatus as claimed in claim 1, further comprising a mixture intake cylinder connected to an inlet end of the rotary tubular furnace.

24. The apparatus as claimed in claim 23, wherein the diameter of the mixture intake cylinder is 0.5 m to 1.5 m.

25. The apparatus as claimed in claim 23, further comprising a mixture outlet cylinder connected to an outlet end of the rotary tubular furnace.

26. The apparatus as claimed in claim 25, wherein the mixture outlet cylinder has a diameter of 1 m to 3 m.

27. The apparatus as claimed in claim 25, further comprising an inlet cone for connecting the mixture intake cylinder to the rotary tubular furnace.

28. The apparatus as claimed in claim 27, further comprising an outlet cone for connecting the mixture outlet cylinder to the rotary tubular furnace.

29. The apparatus as claimed in claim 28, further comprising at least one brush means disposed in the outlet cone for brushing off material penetrating a space between the rotary tubular furnace and the mixture outlet cylinder.

30. The apparatus as claimed in claim 29, wherein the brush means comprises at least one cleaning element for transporting material penetrating into the space between the rotary tubular furnace and the mixture outlet cylinder, back into the mixture outlet cylinder.

31. The apparatus as claimed in claim 27, further comprising at least one brush means disposed in the inlet cone for brushing off material penetrating a space between the rotary tubular furnace and the mixture intake cylinder.

32. The apparatus as claimed in claim 31, wherein the brush means comprises at least one cleaning element for transporting material penetrating into the space between the rotary tubular furnace and the mixture intake cylinder, back into the mixture intake cylinder.

33. The apparatus as claimed in claim 25, further comprising flanges disposed at ends of the mixture outlet cylinder and further comprising seals disposed in the flanges for air-tight sealing of the rotary tubular furnace.

34. The apparatus as claimed in claim 25, further comprising transport spirals disposed in the mixture outlet cylinder of the rotary tubular furnace for transporting the mixture.

35. The apparatus as claimed in claim 34, further comprising a plurality of scoop pockets disposed in the interior space of the rotary tubular furnace which transport the mixture up the outlet cone into the mixture outlet cylinder.

36. The apparatus as claimed in claim 23, further comprising flanges disposed at ends of the mixture intake cylinder and further comprising seals disposed in the flanges for air-tight sealing of the rotary tubular furnace.

37. The apparatus as claimed in claim 1, wherein the rotary tubular furnace, for the mechanical transport of the mixture, is inclined with respect to a horizontal axis.

38. The apparatus as claimed in claim 37, wherein the inclination is 10 mm/m to 20 mm/m.

39. The apparatus as claimed in claim 1, wherein the rotary tubular furnace further comprises a hinge bearing at an outlet end, so that the rotary tubular furnace can be swung into an inclination by elevation at an opposite inlet end and pivoting the rotary tubular furnace about the hinge bearing.

40. The apparatus as claimed in claim 1, further comprising a measuring beam disposed in the interior space of the rotary tubular furnace; and further comprising a plurality of thermocouples fixed to the measuring beam for monitoring the mixture temperature in the rotary tubular furnace, wherein the measuring beam is stationary relative to the rotary tubular furnace.

41. The apparatus as claimed in claim 40, wherein the plurality of thermocouples comprises five to twenty thermocouples.

42. The apparatus as claimed in claim 40, further comprising a plurality of heating zones along the rotary tubular furnace, wherein two thermocouples are provided per heating zone.

43. The apparatus as claimed in claim 42, wherein, at the longitudinal axis of the rotary tubular furnace, in each case two thermocouples are provided, which are fixed at different distances to the longitudinal axis.

44. The apparatus as claimed in claim 1, further comprising a plurality of process zones along the longitudinal axis of the rotary tubular furnace.

45. The apparatus as claimed in claim 44, wherein a first process zone is disposed at an intake end of the rotary tubular furnace and predrying of the mixture is performed in the first process zone, preferably from 0.8% to 0.2% water content to 100 ppm to 50 ppm water content.

46. The apparatus as claimed in claim 45, wherein a surface reaction takes place in a second process zone for the partial saponification of the mixture.

47. The apparatus as claimed in claim 46, wherein a diffusion reaction takes place in a third process zone to remove aromatic impurities in the mixture.

48. The apparatus as claimed in claim 1, wherein, in the rotary tubular furnace, at least three heating zones are provided.

49. The apparatus as claimed in claim 48, wherein the heating zones are equal in length.

50. The apparatus as claimed in claim 1, further comprising a plurality of heating radiators disposed outside the rotary tubular furnace to heat the rotary tubular furnace externally, so that indirect heating of the mixture in the rotary tubular furnace can be accomplished.

51. The apparatus as claimed in claim 1, wherein the rotary tubular furnace includes a hot-air orifice at an inlet end for the inflow of hot air into the interior space of the rotary tubular furnace, and an air outflow orifice at an outlet end for the outflow of the hot air out of the interior space of the rotary tubular furnace.

52. The apparatus as claimed in claim 51, further comprising a hot-air producer disposed outside of the rotary tubular furnace for producing the hot air, the temperature of which essentially corresponds to the temperature in the interior space of the heated rotary tubular furnace.

53. The apparatus as claimed in claim 51, further comprising a hot-air drier disposed outside of the rotary tubular furnace for drying the hot air provided for the interior of the rotary tubular furnace.

54. The apparatus as claimed in claim 51, further comprising means for generating, in the rotary tubular furnace, a countercurrent air flow in the opposite direction to the direction of motion in the mixture.

55. The apparatus as claimed in claim 1, further comprising a mixer for mixing the mixture prior to its entry into the rotary tubular furnace, which mixer preferably includes a heated mixing screw.

56. The apparatus as claimed in claim 55, further comprising a predrier disposed upstream of the mixer for drying the polyester provided for the mixer.

57. The apparatus as claimed in claim 56, wherein a heating output of the predrier for drying the contents of the predrier is greater than an aerating power of the predrier for drying the contents of the predrier.

58. The apparatus as claimed in claim 56, further comprising means for generating a countercurrent airflow in the predrier in the opposite direction to the direction of motion of the mixture in the predrier.

59. An apparatus for cleaning polyester, comprising:
an at least partially heated rotary tubular furnace to be fed with a mixture of polyester and an alkaline material and for carrying out a saponification reaction in the mixture, wherein the rotary tubular furnace comprises a shell which defines a cylindrical, hollow interior space of the rotary tubular furnace, the shell is rotatable about the longitudinal axis of the rotary tubular furnace, and the interior space includes an orifice formed in the shell for connecting the interior space to an exterior space surrounding the rotary tubular furnace in a direction perpendicular to a longitudinal axis of the rotary tubular furnace, a plurality of axially oriented strips formed on an inner surface of the shell of the rotary tubular furnace for preventing the mixture from toppling over, a measuring beam disposed in the interior space of the rotary tubular furnace, wherein the measuring beam is stationary relative to the rotary tubular furnace, a plurality of thermocouples fixed to the measuring beam for monitoring the mixture temperature in the rotary tubular furnace, wherein the thermocouples are fixed at different distances to the longitudinal axis, a first weir disposed within the rotary tubular furnace, wherein the first weir at least partly closes the interior space, and wherein the first weir includes a first through hole and a closure for at least partly closing the first through hole to vary the degree of charge of the rotary tubular furnace by varying a damming action of the first weir, a second weir disposed in the interior space adjacent to and upstream from the orifice, wherein the second weir includes a second through hole disposed adjacent to the orifice in the shell of the rotary tubular furnace, deflecting means pivotally attached to a downstream side of the second weir, wherein the deflecting means extends toward the orifice at a point of rotation of the shell where the orifice is located on an underside of the rotary tubular furnace, a screen device attached to the shell for covering the orifice and filtering material which passes through the orifice, and a collection device disposed in the exterior space adjacent the orifice for collecting material passing through the orifice.

* * * * *